(12) United States Patent
Kurz (10) Patent No.: US 11,298,651 B2
(45) Date of Patent: Apr. 12, 2022

(54) GAS-LIQUID SEPARATOR FOR SEPARATING AT LEAST ONE LIQUID COMPONENT FROM A GASEOUS COMPONENT

(71) Applicant: Robert Bosch GmbH, Stuttgart (DE)

(72) Inventor: Michael Kurz, Plochingen (DE)

(73) Assignee: Robert Bosch GmbH, Stuttgart (DE)

( * ) Notice: Subject to any disclaimer, the term of this patent is extended or adjusted under 35 U.S.C. 154(b) by 88 days.

(21) Appl. No.: 16/766,876

(22) PCT Filed: Oct. 24, 2018

(86) PCT No.: PCT/EP2018/079186
§ 371 (c)(1),
(2) Date: May 26, 2020

(87) PCT Pub. No.: WO2019/105661
PCT Pub. Date: Jun. 6, 2019

(65) Prior Publication Data
US 2020/0328434 A1    Oct. 15, 2020

(30) Foreign Application Priority Data

Nov. 28, 2017  (DE) ...................... 10 2017 221 309.4

(51) Int. Cl.
*B01D 53/22* (2006.01)
*H01M 8/04089* (2016.01)
(Continued)

(52) U.S. Cl.
CPC ........ *B01D 53/22* (2013.01); *H01M 8/04097* (2013.01); *H01M 8/04164* (2013.01);
(Continued)

(58) Field of Classification Search
None
See application file for complete search history.

(56) References Cited

U.S. PATENT DOCUMENTS

2003/0170514 A1*  9/2003  Faye ................... H01M 8/0662
                                                     95/32
2004/0115504 A1*  6/2004  Moeller .............. H01M 8/0687
                                                     429/411
(Continued)

FOREIGN PATENT DOCUMENTS

DE        10120018       12/2001
DE       102009053499     5/2011
(Continued)

OTHER PUBLICATIONS

International Search Report for Application No. PCT/EP2018/079186 dated Feb. 1, 2019 (English Translation, 2 pages).

*Primary Examiner* — Jason M Greene
(74) *Attorney, Agent, or Firm* — Michael Best & Friedrich LLP (57) ABSTRACT

The invention relates to a gas-liquid separator (2) for separating at least one liquid component, in particular $H_2O$, from a gaseous component, in particular $H_2$, the separator comprising at least one collecting tank (12) which is supplied with a medium, at least the liquid component of the medium being separated into the collecting tank (12), and the separated portion of the medium being discharged from the collecting tank (12) via a discharge valve (46). According to the invention, the gas-liquid separator (2) is integrated into a housing (11) of a recirculation pump (9).

15 Claims, 3 Drawing Sheets

(51) Int. Cl.
*H01M 8/04119* (2016.01)
*H01M 8/0662* (2016.01)

(52) U.S. Cl.
CPC ..... *H01M 8/0662* (2013.01); *B01D 2053/221* (2013.01); *B01D 2221/14* (2013.01)

(56) References Cited

U.S. PATENT DOCUMENTS

| | | | | |
|---|---|---|---|---|
| 2005/0147863 | A1* | 7/2005 | Hiramatsu | H01M 8/04097 |
| | | | | 429/413 |
| 2007/0264554 | A1* | 11/2007 | Fujita | H01M 8/04097 |
| | | | | 429/410 |
| 2010/0092818 | A1 | 4/2010 | Lee et al. | |
| 2011/0189555 | A1* | 8/2011 | Baur | H01M 8/04097 |
| | | | | 429/414 |
| 2014/0272631 | A1* | 9/2014 | Sanderson | H01M 8/0687 |
| | | | | 429/414 |
| 2016/0355933 | A1* | 12/2016 | Diethelm | H01M 8/04097 |

FOREIGN PATENT DOCUMENTS

| | | |
|---|---|---|
| DE | 102010035860 | 3/2012 |
| DE | 102011114732 | 4/2013 |
| DE | 102014220891 | 4/2015 |
| JP | 2005042712 A | 2/2005 |
| JP | 2009531171 A | 9/2009 |

* cited by examiner

GAS-LIQUID SEPARATOR FOR SEPARATING AT LEAST ONE LIQUID COMPONENT FROM A GASEOUS COMPONENT

BACKGROUND

The present invention concerns a gas-liquid separator the separating at least one liquid component from a gaseous component, wherein the gas-liquid separator is integrated in a housing of the recirculation pump, and wherein at least the liquid component of the medium is separated out, in particular for use in a fuel cell system of vehicles with fuel cell drive.

In the automotive sector, as well as liquid fuels, in future gaseous fuels will play an increasing role. In particular in vehicles with fuel cell drive, hydrogen gas flows must be controlled. Here, the gas flows are no longer controlled discontinuously such as on injection of liquid fuel, but gas is extracted from at least one high-pressure tank and conducted to an ejector unit via an inflow line of a medium-pressure line system. This ejector unit conducts the gas to a fuel cell via a connecting line of a low-pressure line system. From this fuel cell, an exhaust gas—which in particular consists of unused hydrogen and an inactive part, in particular water and nitrogen—is recirculated via a recirculation path.

DE 10 2014 220 891 A1 discloses a gas-liquid separator for separating a liquid component, in particular water, from a gaseous component, in particular exhaust gas, which is emitted by the fuel cell. This gas-liquid separator here forms the housing into which exhaust gas is introduced via an introduction pipe. Water contained in the exhaust gas is separated out of the exhaust gas in the housing. Then the exhaust gas, which contains substances such as hydrogen (the hydrogen being referred to below as $H_2$), is returned to the fuel cell via an outlet pipe. Furthermore, the housing has a drainage connection via which separated and stored water is drained out of the housing to the outside.

The gas-liquid separator known from DE 10 2014 220 891 A1 may have certain disadvantages.

The known gas-liquid separator must be integrated into the periphery of the fuel cell system, in particular fluidically, as an additional component. Thus the gas-liquid separator, since it is present as an additional component, requires its own housing and its own line connection.

Since the exhaust gas from the fuel cell, which is introduced into the housing via an introduction pipe, contains not only water as a component (water being referred to below as $H_2O$) but also further heavy constituents, in particular gaseous nitrogen (referred to below as $N_2$), this is conveyed with the $H_2$ out of the housing, e.g. via the outlet pipe, back to the fuel cell. Thus the gas-liquid separator has the disadvantage that not only is almost pure $H_2$ returned to the fuel cell, but also other heavy constituents such as for example $N_2$. This reduces the efficiency of the fuel cell and hence of the fuel cell system.

US 2011/0189555 A1 refers to a device for supplying fuel to a fuel cell of a fuel cell system. The fuel cell system comprises a mixing region in which surplus fuel gas is mixed with freshly supplied gaseous fuel, furthermore a water separator and a device for at least indirectly heating the supplied fresh fuel.

DE 10 2010 035 860 A1 concerns a fuel cell system. This comprises a fuel cell with an anode chamber and a cathode chamber, with a hydrogen pressure accumulator and a recirculation line. The latter connects an outlet of the anode chamber to an inlet of the anode chamber. Furthermore, a recirculation conveying device with a compressor wheel is provided in the region of the recirculation line, with a turbine for expanding the pressurized hydrogen before the inlet to the anode chamber.

DE 10 2009 053 499 A1 refers to a fuel cell system with an anode circuit. The fuel cell system comprises an anode circuit by means of which unconsumed gas from the anode region of a fuel cell can be returned to the anode region via a recirculation conveying device. At least one liquid separator is arranged in the anode circuit. The liquid separator is designed to be structurally integrated into one component with the recirculation conveying device. Fresh hydrogen is supplied to the anode region by the supply of hydrogen into the liquid separator.

DE 101 20 018 A1 discloses a fuel cell system with a compact water separator. The water separator is designed to be compact in structure and has a low pressure loss and a high efficiency for separating liquid water from water-loaded flows in the system. The cylinder separator is provided with a sump for collection of the water, an outlet for removal of the water from the sump and for diverting this to a reservoir. A shut-off valve is provided in conjunction with the outlet for controlling the flow through the outlet, together with a water level switch which controls the opening/closing of the valve. The switch triggers a closing of the valve before the sump is empty, in order to create a water seal which prevents escape of gas through the outlet.

SUMMARY

According to the invention, a gas-liquid separator is proposed which is integrated in a housing of a recirculation pump. In this way, the advantage can be achieved that the gas-liquid separator does not require an additional housing since it is integrated in the housing of the recirculation pump. This allows a cost saving, since the material costs and/or production costs for the separate gas-liquid separator housing may be saved. Furthermore, integration of the gas-liquid separator in the housing of the recirculation pump offers the advantage that the component parts, being the recirculation pump and/or gas-liquid separator, and/or a complete fuel cell system, require less installation space, in particular less installation space in the vehicle; firstly, the space for the separate gas-liquid separator housing is no longer required, and/or the supply and outlet lines for fluidic connection of the gas-liquid separator are obsolete, in particular if the gas-liquid separator is located directly on the internal flow lines of the recirculation pump. In this way, the flow resistances inside the recirculation pump and/or the gas-liquid separator and/or the complete fuel cell system are reduced, whereby the efficiency may be increased and/or operating costs reduced. In addition, assembly and material costs for the supply and outlet lines—now no longer required—may be saved.

Furthermore, by integrating the gas-liquid separator in the housing of the recirculation pump, the advantage may be achieved that the cold-start properties of the gas-liquid separator and/or the recirculation pump and/or the entire fuel cell system may be improved. Since the gas-liquid separator is now integrated in the housing of the recirculation pump, it is better protected against cold temperatures, wherein cold temperatures bring the risk that liquid $H_2O$ which has collected in the gas-liquid separator may freeze and thereby damage the gas-liquid separator, and/or on a cold-start process of a fuel cell and/or the vehicle, ice fragments can travel with the incipient flow into the fuel cell system and damage further components of the fuel cell system and/or the fuel cell itself. Thus the probability of failure of the recirculation pump and/or gas-liquid separator and/or the complete fuel cell system may be reduced.

According to a particularly advantageous embodiment, in a flow direction, the gas-liquid separator is arranged downstream of a compressor chamber of the recirculation pump, in particular in the region of an outlet. In this way, the advantage can be achieved that no additional energy is required for the gas-liquid separator in order to achieve a separation of the constituent $H_2O$ from the medium, in particular from the $H_2$. For this, acceleration and/or compression of the medium by the recirculation pump is sufficient to give the medium a corresponding speed and/or corresponding pressure so that the constituent $H_2O$ may be separated from the medium by means of the gas-liquid separator. It is here advantageous in particular that the gas-liquid separator is arranged downstream of the recirculation pump. Thus no additional components such as e.g. pumps are required in the region of the gas-liquid separator. In this way, the efficiency of the gas-liquid separator and/or the recirculation pump and/or the entire fuel cell system may be increased, and the operating costs can be reduced. Also, there are no further component costs for further components such as e.g. pumps in the region of the gas-liquid separator, whereby the costs for the entire fuel cell system may be reduced.

According to an advantageous refinement, in a flow direction, the gas-liquid separator is arranged upstream of the compressor chamber of the recirculation pump, in particular in the region of an inlet. This avoids the disadvantage that $H_2O$ must be conveyed with the medium to be delivered through the recirculation pump, in particular through the compressor chamber. This achieves the advantage that, firstly, the efficiency of the recirculation pump may be improved and the delivery quantity of the $H_2$ necessary for energy generation in the fuel cell increased, whereby the efficiency and/or the power of the fuel cell can be improved. Secondly, the penetration of $H_2O$ into the compressor chamber of the recirculation pump and/or into the recirculation pump can be prevented or at least reduced. $H_2O$ entering the recirculation pump can damage the movable components and/or components which are not corrosion-resistant and/or the electrical components of the recirculation pump. If the components of the recirculation pump at which an electrical short circuit occurs are damaged by penetrating $H_2O$, then again the complete fuel cell system may be damaged. Thus with the embodiment of the gas-liquid separator according to the invention, the service life of the recirculation pump and/or the complete fuel cell system may be extended. Furthermore, the possibility of failure of the entire fuel cell system may be reduced.

According to an advantageous embodiment, in addition to the liquid constituent $H_2O$, a gaseous constituent $N_2$ is separated out of the medium by the gas-liquid separator. In this way, the advantage may be achieved that several undesirable components of the medium, which in particular may be waste products of a recirculation medium from the fuel cell, may be separated out simultaneously by means of the gas-liquid separator. In this way, the proportion in the fuel cell system of a gaseous component of the medium, which is required to generate energy in the fuel cell, in particular on an anode side, is increased. By means of the gas-liquid separator, the constituents $H_2O$ and $N_2$ are separated from the $H_2$ and conducted out of an outflow channel of the recirculation pump into a collecting tank. This offers the advantage that the efficiency of the fuel cell and/or the fuel cell system is increased, while the undesirable components, which occur as byproducts and/or waste products in operation of the fuel cell, are separated out by means of the gas-liquid separator, and hence a higher proportion of the component necessary to generate energy in the fuel cell can be returned to the fuel cell. Furthermore, with the embodiment of the gas-liquid separator according to the invention, there is no longer a need for an additional component in the fuel cell system for discharging the gaseous $N_2$, for example in the form a drainage valve, since this task is performed by the gas-liquid separator. The gas-liquid separator therefore separates $H_2O$ and $N_2$ from the medium in one process step. In this way, the advantage may be achieved that costs can be saved since the additional drainage valve for drainage of $N_2$ is no longer required. Furthermore, the demand for $H_2$ in operation of the fuel cell system may be reduced, which in turn leads to cost savings in operating costs.

According to a particularly advantageous refinement, the gas-liquid separator has an outflow channel, a separating edge and the collecting tank, wherein the outflow channel in the flow direction firstly has a first constriction and then a curvature with a radius, in particular in the region of the separating edge. In this way, the medium and the different constituents of the medium are decelerated less strongly by the separating edge during the separating process, in comparison with a stronger deceleration of the medium when no separating edge is provided. The separating edge thus supports the process of separating the heavy constituents $H_2O$ and $N_2$ from the lighter constituent $H_2$ of the medium. This allows an efficient outflow with low flow losses of $H_2O$ and $N_2$ into the collecting tank and of $H_2$ to the outlet. Furthermore, the medium with the high $H_2$ proportion may move on from there in the flow direction through an outflow line, without further flow-promoting components such as pumps or fans being required in the region of the at least one tank in order to ensure onward transport of the medium with the high $H_2$ proportion. Thus energy for operating further flow-promoting components, in particular electrically powered pumps or fans in the region of the at least one tank or on the at least one tank, may be reduced. In this way, the efficiency of the fuel cell system may be increased and operating costs reduced.

According to an advantageous embodiment, the gas-liquid separator has the inlet, the separating edge and the collecting tank, wherein in the flow direction, the inlet firstly has a second constriction and then the curvature with the radius, in particular in the region of the separating edge. In this way, the medium consisting of the constituents $H_2$, $H_2O$ and $N_2$ is first accelerated on flowing through the inlet and the second constriction, and then deflected by means of the curvature in the flow direction. Here it meets the separating edge in the outer region, in which in particular the centrifugal forces acting on the medium are greatest. This gives the advantage that the constituents $H_2O$ and $N_2$, which in particular have a greater mass than $H_2$, are deflected towards the outer region of the curvature in a flow direction and hence towards a separating edge and the collecting tank, while the constituent $H_2$, because of its lighter mass, is deflected less greatly towards the outer region of the curvature and hence rather takes the shorter route via the region of the curvature on the inside of the curve. This gives the advantage that a higher proportion of $H_2O$ and $N_2$ in the medium can be achieved, and hence the efficiency of the separating process of the gas-liquid separator increased, such that the medium which flows out via the outlet from the recirculation pump is almost completely free from the constituents $H_2O$ and $N_2$. In this way, the efficiency of the entire fuel cell system may be improved.

According to an advantageous refinement, the gas-liquid separator separates the constituents $H_2O$ and $N_2$ from the medium by means of a centrifugal principle. Furthermore, on flowing through the first and/or second constriction, the medium is accelerated in the flow direction. Also, on flowing through the curvature, the medium undergoes a deflection in the flow direction such that the constituents $H_2O$ and $N_2$, because of their mass, undergo a greater deflection, and the light constituent $H_2$, because of its mass, undergoes a lesser deflection. In this way, the advantage may be achieved that the separation process in the gas-liquid separator is improved so that the constituents $H_2O$ and $N_2$ are almost completely separated from the medium, in particular from the $H_2$. In this way, it can be ensured that as high as possible a proportion of $H_2$ is returned to the fuel cell, whereby firstly the efficiency and/or the power of the fuel cell may be increased. Furthermore, the advantage may be achieved that to separate the constituents $H_2O$ and $N_2$ from the constituent $H_2$, no additional energy and/or only a small quantity of energy need be provided, in particular by the fuel cell system and/or the higher-level vehicle system. This is because the medium flowing through the first constriction and/or through the second constriction has a higher flow speed, in particular because of the acceleration by the respective constriction which acts as a Venturi nozzle. This higher flow speed is advantageous in separating the components by means of the centrifugal principle. A further introduction of energy, in particular kinetic energy, into the medium is thus no longer necessary to achieve an optimal efficiency of the separating process by the gas-liquid separator using the centrifugal principle. In this way, the efficiency of the fuel cell system may be increased and operating costs may be reduced.

According to a further advantageous embodiment, when flowing through the curvature, the medium meets the separating edge, wherein the light constituent $H_2$ is deflected in a flow direction to the outlet and the constituents $H_2O$ and $N_2$ are deflected in a flow direction into the collecting tank, wherein in particular a small proportion of the light constituent $H_2$ may also be deflected into the collecting tank. In this way, the medium and the different components of the medium are decelerated less strongly by the separating edge in the separating process, in comparison with a stronger deceleration of the medium when there is no separating edge. The separating edge thus supports the process of separating the heavy constituents $H_2O$ and $N_2$ from the lighter constituent $H_2$ of the medium, in particular by means of the centrifugal principle. This allows an efficient outflow with low flow losses of $H_2O$ and $N_2$ into the collecting tank and of $H_2$ to the outlet. Furthermore, the medium with the high $H_2$ proportion may move on from there in the flow direction through the outflow without further flow-promoting components such as pumps or fans being required in the region of the at least one tank in order to allow onward transport of the medium with the high $H_2$ proportion. Thus energy for operating further flow-promoting components, in particular electrically powered pumps or fans in the region of the at least one tank or on the at least one tank, may be reduced. In this way, the efficiency of the fuel cell system may be increased and operating costs reduced.

According to a particularly advantageous refinement, $H_2$ is returned from the collecting tank via a suction connection into an inflow channel of the recirculation pump. Furthermore, $H_2$ may be returned from the collecting tank via the suction connection into the inflow channel or into the outflow channel of the recirculation pump. In this way, the advantage may be achieved that the constituent $H_2$, which in the separating process is unfavorably and undesirably conducted into the collecting tank together with the $H_2O$ and $N_2$, is not discharged towards the outside together with the constituents $H_2O$ and $N_2$ on venting of the collecting tank by means of a discharge valve. The constituent $H_2$ may rather be returned to the recirculation process and hence to the fuel cell system where it is again available for energy production in the fuel cell. In this way, less $H_2$ for energy production need be supplied from outside the fuel cell system, for example from a high-pressure tank. Thus the operating costs of the fuel cell system and finally of the complete vehicle may be lowered. Furthermore, this may prevent the discharge of more $H_2$ into the area outside the fuel cell system, which under certain situations, such as e.g. when a vehicle is parked in an underground garage, may jeopardize safety because of the flammability of $H_2$. Furthermore, the advantage may be achieved that the efficiency and/or power of the fuel cell can be increased.

According to an advantageous embodiment, the suction connection has a choke element. Because of the suction connection which creates a further connection of the collecting tank to the flow channels of the recirculation pump and fuel cell system, under certain conditions the efficiency of the recirculation pump may deteriorate, since the recirculation pump is operated by means of a compressor wheel which must generate additional energy in the compressor chamber, wherein because of the suction connection, a continuous pressure exchange and hence pressure loss takes place between a low-pressure side which in particular lies in the region of the inflow channel, and a high-pressure side which in particular lies in the region of the outflow channel. Because now a choke element is used which achieves the greatest possible choking between the region of the collecting tank and the flow channels of the recirculation pump, the efficiency losses of the recirculation pump can be kept low. The choke element thus reduces the pressure loss, for example by a small flow diameter cross-section. Thus the pressure losses between the high-pressure side and the low-pressure side can be kept small, whereby the efficiency of the recirculation pump may be increased and the operating costs reduced.

According to an advantageous refinement, a membrane chamber is situated between the collecting tank and the suction connection, wherein the membrane chamber in particular has a membrane insert. Furthermore, the membrane insert is configured as a semipermeable membrane, wherein the light constituent $H_2$ of the medium can move through the membrane while the constituents $H_2O$ and $N_2$ cannot move through the membrane, in particular because of the molecular size. In this way, firstly the advantage may be achieved that lower pressure losses occur between the low-pressure side and high-pressure side via the suction connection, since the membrane has a pressure-reducing effect. Furthermore, the advantage may be achieved that the membrane prevents the constituents $H_2O$ and $N_2$ from being able to flow back through the suction connection to the recirculation pump and fuel cell system, since the molecular size is too large to pass through the membrane. The constituent $H_2$, which has flowed into the collecting tank unfavorably and undesirably with the $H_2O$ and $N_2$, may however diffuse through the membrane and thus pass through the membrane, since the molecular size of $H_2$ is smaller than the molecular size of $H_2O$ and $N_2$. Furthermore, the membrane prevents the passage of $H_2O$ through the suction connection when the $H_2O$ is present in liquid state, because of surface tension.

Thus the efficiency of the recirculation pump and of the entire fuel cell system may be increased.

BRIEF DESCRIPTION OF THE DRAWINGS

An exemplary embodiment of the invention is described below in detail with reference to the attached drawing. The drawing shows.

DETAILED DESCRIPTION

Figure 1:
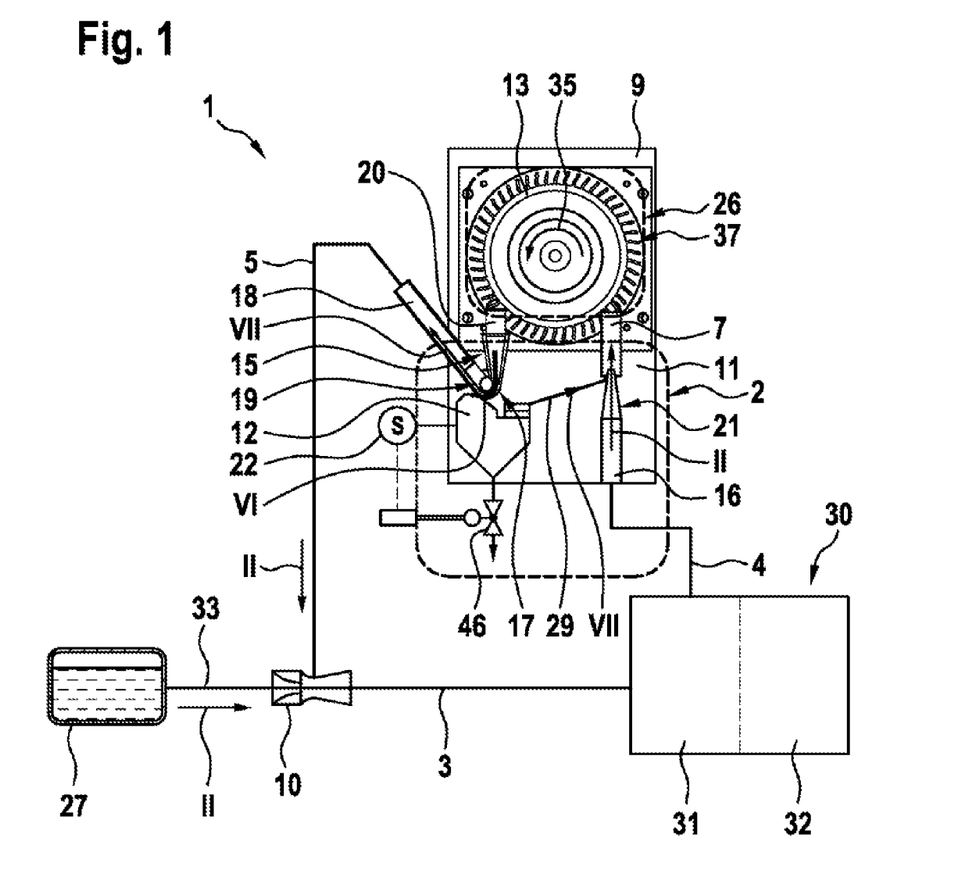
FIG. 1 a schematic depiction of a fuel cell system with a gas-liquid separator according to the invention, according to a first exemplary embodiment, FIG. 2 a schematic depiction of a gas-liquid separator according to the invention, according to a second exemplary embodiment, FIG. 3 a schematic depiction of a gas-liquid separator according to the invention, according to a third exemplary embodiment, FIG. 4 a schematic depiction of a gas-liquid separator according to the invention, according to a fourth exemplary embodiment.

The illustration in FIG. 1 shows a fuel cell system 1 with a first exemplary embodiment of a gas-liquid separator 2 according to the invention, wherein in an exemplary embodiment, the gas-liquid separator 2 also separates the gaseous constituent $N_2$ from the medium, in addition to the liquid constituent $H_2O$, wherein in particular the gaseous constituent $N_2$ has a higher mass than the constituent $H_2$.

FIG. 1 shows the fuel cell system 1 in which a recirculation pump 9 is shown with a gas-liquid separator 2, wherein the gas-liquid separator 2 is integrated in the housing 11 of the recirculation pump 9. Furthermore, it is evident that the fuel cell system 1 has a fuel cell 30 and an integrated jet pump 10. The recirculation pump 9 with gas-liquid separator 2, the integrated jet pump 10 and the fuel cell 30 are fluidically connected together by means of lines. The fuel cell 30 has an anode region 31 and a cathode region 32, and serves for energy generation, in particular in a vehicle, by means of a reaction of hydrogen ($H_2$) and oxygen ($O_2$). The energy may be produced in the form of electrical energy.

The gas-liquid separator 2 according to the invention and/or the recirculation pump 9 is fluidically connected to the anode region 31 via a connecting line 4. A medium, which in particular is a recirculation medium from the anode region 31 of the fuel cell 30, is conducted to the recirculation pump 9 for recirculation. The recirculation medium consists almost completely of unused $H_2$ which has not been consumed inside the fuel cell 30 for chemical or electrical reaction with oxygen, and the waste products $H_2O$ and $N_2$ from the process of energy production inside the fuel cell 30. The medium flows in a flow direction II onto the anode side, through the connecting line 4, into an inlet 16 of the recirculation pump 9. The constituents $H_2O$ and $N_2$ may alternatively be described as inactive gas portions, wherein the constituents cannot be used for energy production in the anode region 31 in the fuel cell 30. Thus the efficiency for complete operation of the fuel cell system 1 is reduced by the constituents $H_2O$ and $N_2$ in the recirculation path, since if these components are not separated out by means of the gas-liquid separator 2, they must be conveyed through the entire anode path, in particular through the connecting line 4, an outflow line 5, the recirculation pump 9, the optional integrated jet pump 10 and an inflow line 3. Thus smaller masses and/or volumes of the constituent $H_2$, which is necessary for energy production in the fuel cell 30, can be conveyed and/or recirculated.

FIG. 1 furthermore shows that the medium flows via the inlet 16 in the flow direction II through a second constriction 21 into the inflow channel 7 of the recirculation pump 9. Because of the reducing diameter of the second constriction 21, the medium is accelerated before it flows through the inflow channel 7 into a compressor chamber 26 of the recirculation pump 9. The recirculation pump 9 inside the housing 11 has a compressor wheel 13, wherein the compressor wheel 13 is situated in the compression chamber 26, and wherein the compressor wheel 13 executes a rotation in a rotational direction 35. The rotation of the compressor wheel 13, on which blades 37 are arranged on the outer periphery, causes an acceleration and/or compression of the gaseous medium in the rotational direction 35 from the region of the inflow channel 7 to the region of an outflow channel 28 in the compressor chamber 26 of the recirculation pump 9. After acceleration and/or compression of the gaseous medium by the compressor wheel 37, the gaseous medium flows from the outflow channel 20 through a first constriction 15 into the region of a curvature 19, wherein the curvature 19 has a radius 17 and wherein a deflection and/or flow guidance of the gaseous medium takes place in the region of the curvature 19. When the medium flows through the curvature 19 in the flow direction II, the constituents $H_2O$ and $N_2$ are separated from the medium by means of the centrifugal principle. On flowing through the first constriction 15, the medium is accelerated in the flow direction II, wherein when the medium then flows through the curvature 19, it undergoes a deflection in the flow direction II such that the constituents $H_2O$ and $N_2$, because of their mass, undergo a greater deflection and the light constituent $H_2$, because of its mass, undergoes a smaller deflection. The heavy constituents $H_2O$ and $N_2$ here flow in a flow direction VI into a collecting tank 12 and are thus separated from the medium, wherein the medium—which consists almost completely of $H_2$—flows on in a flow direction VII to an outlet 18 of the recirculation pump 9. The collecting tank 12 is arranged on the outer radius 17 of the curvature 19. It is however possible that, in the separating process, disadvantageously the constituent $H_2$ also flows out into the collecting tank 12 with the $H_2O$ and $N_2$. So that this $H_2$ is not lost for the further energy production process in the fuel cell system 1, a return of $H_2$ from the collecting tank 12 to the inflow channel 7 of the recirculation pump 9 via a suction connection 29 is provided.

Furthermore, FIG. 1 shows that the collecting tank 12 in its lower region has a discharge valve 46, wherein the discharge valve 46 is connected to a sensor assembly 22. The sensor assembly 22 continuously detects the $H_2O$ and $N_2$ proportion and in some cases the $H_2$ proportion, and/or the pressure in the collecting tank 12, and as soon as a specific value relative to the concentration of the constituents $H_2O$ and $N_2$ and/or a pressure is exceeded, the discharge valve 46 is actuated and the constituents $H_2O$ and $N_2$ are discharged from and/or conducted out of the collecting tank 12, in particular the lower region, by means of the discharge valve 46. In a possible exemplary embodiment of the fuel cell system 1, the constituents $H_2O$ and $N_2$ pass through the discharge valve 46 via an optional return line into an intake tract of the fuel cell system 1. From there, the constituents $H_2O$ and $N_2$ flow on into the cathode region 32 of the fuel cell 30 through the intake tract. In an exemplary embodiment, a suction connection 29 is provided, by means of which $H_2$ can be conducted back from the collecting tank 12 into the inflow channel 7 so that $H_2$ is not conducted out of the fuel cell circuit.

As evident from FIG. 1, the gas-liquid separator 2 according to the first exemplary embodiment is arranged downstream of the compressor chamber 26 of the recirculation pump 9 in a flow direction II, wherein the gas-liquid separator 2 is in particular situated in the region of the outlet 18.

After the medium has flowed through the recirculation pump 9 and out through the outlet 18, the medium—which in particular now consists almost completely of $H_2$—flows on in flow direction II via the outflow line 5 into the integrated jet pump 10. Inside the jet pump 10, a so-called jet pump effect takes place. For this, a gaseous propellant, in particular $H_2$, flows through a tank line 33, for example from outside the jet pump 10, from a tank 27, in particular a high-pressure tank 27, into the jet pump 10. Furthermore, the recirculation medium is conveyed by the recirculation pump 9 into an intake region of the jet pump 10. The propellant is now introduced into the intake region under high pressure. The gaseous propellant flows in the flow direction II. The $H_2$ flowing out of the high-pressure tank 27 into the intake region of the jet pump 10 and serving as a propellant has a pressure difference from the recirculation medium flowing into the intake region, wherein the propellant in particular has a higher pressure of at least 10 bar. In order for the jet pump effect to occur, the recirculation medium is conveyed with a low pressure and low mass flow into the intake region of the jet pump 10. The propellant flows into the intake region with the described pressure difference and a high speed, which in particular lies close to the speed of sound. Here, the propellant hits the recirculation medium which is already present in the intake region. Because of the high speed and/or pressure difference between the propellant and the recirculation medium, an internal friction and turbulence between the media are generated. This causes a shear stress in the boundary layer between the rapid propellant and the substantially slower recirculation medium. This stress causes a pulse transmission, wherein the recirculation medium is accelerated and carried along. The mixing takes place on the principle of conservation of momentum. The recirculation medium is accelerated in the flow direction II and a pressure fall occurs for the recirculation medium, whereby a suction effect takes place and further recirculation medium is conveyed from the region of the recirculation pump 9.

After the recirculation medium has been accelerated in the jet pump 10 by the propellant and the two media have mixed, the new resulting medium—which in particular consists almost completely of $H_2$—flows through the inflow line 3 to the fuel cell 30, in particular to the anode region 31.

Figure 2:
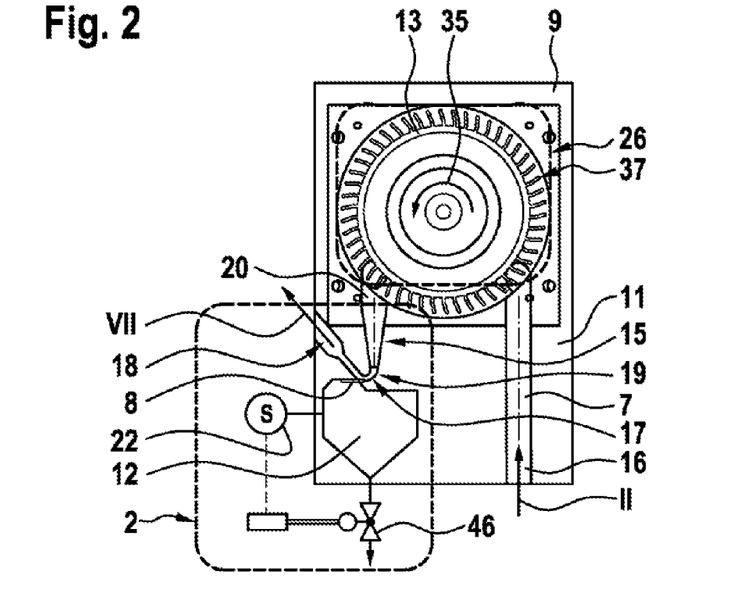

The diagrammatic depiction of the gas-liquid separator 2 according to a second exemplary embodiment in FIG. 2 shows that the outflow channel 20 has the separating edge 8 in the region of the curvature 19. When flowing through the curvature 19, the medium hits the separating edge 9, wherein the light constituent $H_2$ is deflected in a flow direction VII to the outlet 18 and the constituents $H_2O$ and $N_2$ are deflected in a flow direction VI to the collecting tank 12, wherein in particular a small part of the light constituent $H_2$ may also be deflected into the collecting tank 12. The separating edge 8 has an advantageous effect on the separating process since it promotes a division of the medium, firstly into the heavy constituents $H_2O$ and $N_2$ in a flow direction VII in the direction of the collecting tank 12, and secondly the light constituent $H_2$ in a flow direction VII in the direction of the outlet 18. When flowing through the curvature 19, the medium hits the separating edge 8 which is arranged on the outer region of the curvature 19, in particular on the region on the outside of the curve. Furthermore, the separating edge 8 has a sharp and/or wedge-shaped region which supports the separation of the constituents $H_2O$ and $N_2$ from the constituent $H_2$, in particular by means of the centrifugal principle. When the medium flows through the curvature 19, a centrifugal force acts on its constituents, which in turn promotes a separation of the constituents $H_2O$ and $N_2$ from the lighter constituent $H_2$, in particular by means of the centrifugal principle.

In addition, it is advantageous that the flow channel 20 tapers by means of the first constriction 19 in the flow direction II. In this way, the flow speed of the medium—which at this time still contains all constituents $H_2O$, $N_2$ and $H_2$—can be increased, whereby the centrifugal force effect is increased and hence promotes separation. Here, furthermore it is also advantageous if the separating edge 8 is arranged in the outflow channel 20 in the region of the curvature 19 such that the separating edge 8 is situated at the lowest point of the outflow channel 20 and/or the curvature 19, and hence on the side facing the direction in which gravity is active. In this way, separation of the heavier constituents and lighter constituents by means of the centrifugal principle may be further supported by the effect of gravity and hence a more efficient separation achieved.

The gas-liquid separator 2 according to a second exemplary embodiment here does not form a suction connection 29 between the collecting tank 12 and for example the inflow channel 7 of the recirculation pump 9. Thus a pressure fall between the outflow channel 20 and the inflow channel 7 may be avoided.

Figure 3:
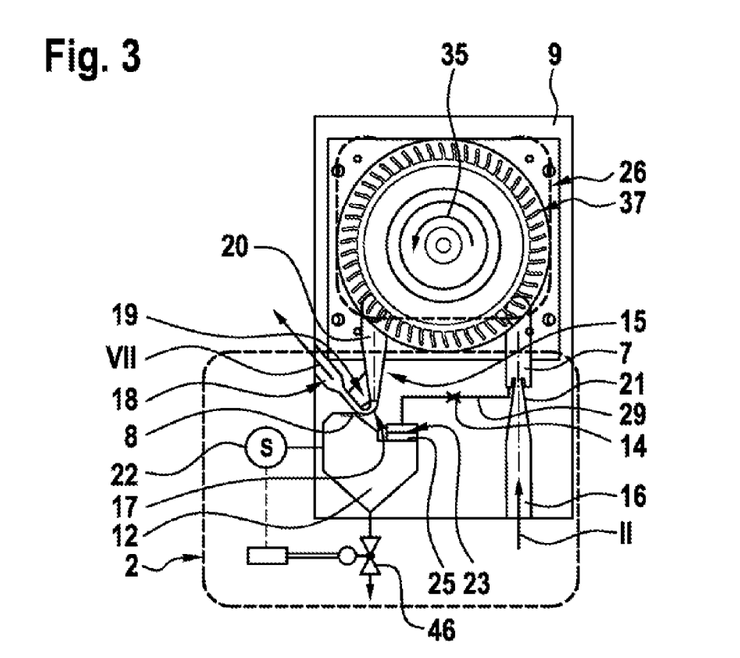

FIG. 3 shows a diagrammatic depiction of the gas-liquid separator 2 according to a third exemplary embodiment. This shows that the suction connection 29 has a choke element 14. In addition, it shows that a membrane chamber 23 is situated in the region between the collecting tank 12 and the suction connection 29, wherein the membrane chamber 23 in particular has a membrane insert 25. The membrane insert 25 is formed as a semipermeable membrane 34, wherein the light constituent $H_2$ of the medium can move through the membrane 34, while movement of the constituents $H_2O$ and $N_2$ through the membrane 34 is not possible, in particular because of the molecular size. The suction connection 29 is here at least approximately at the highest point of the collecting tank 12 and hence on the side of the collecting tank 12 facing away from the direction in which gravity is active, while the discharge valve 46 is at the lowest point the collecting tank 12 and hence on the side of the collecting tank 12 facing the direction in which gravity is active. This may achieve the advantage that because of their high mass, the heavier constituents $H_2O$ and $N_2$ in the collecting tank 12 flow rather in the direction of the discharge valve 46 and in so doing fill the volume of the collecting tank 12 facing the direction in which gravity is active. In contrast, because of its lighter mass, the lighter constituent $H_2$ in the collecting tank 12 flows rather in the direction of the discharge valve 46 and in so doing fills the upper volume of the collecting tank 12 facing away from the direction in which gravity is active. This may achieve the advantage that, due to the layering of the constituents in the collecting tank 12, by using gravity it is ensured that a high proportion of the constituents $H_2O$ and $N_2$ may be discharged through the discharge valve 46, while an outflow of $H_2$ through the discharge valve 46 is almost completely prevented. Furthermore, by the layering of the constituents in the collecting tank 12 by using gravity, it is ensured that a high proportion of the constituent $H_2$ can be returned through the suction connection 29 into the recirculation pump.

The constituent $H_2$ is here conducted in targeted fashion via the intake region 29 into the region of the inlet 16 and/or the inflow channel 7 which lies behind the region of the second constriction 21, wherein in particular a jet pump effect occurs in this region.

Figure 4:
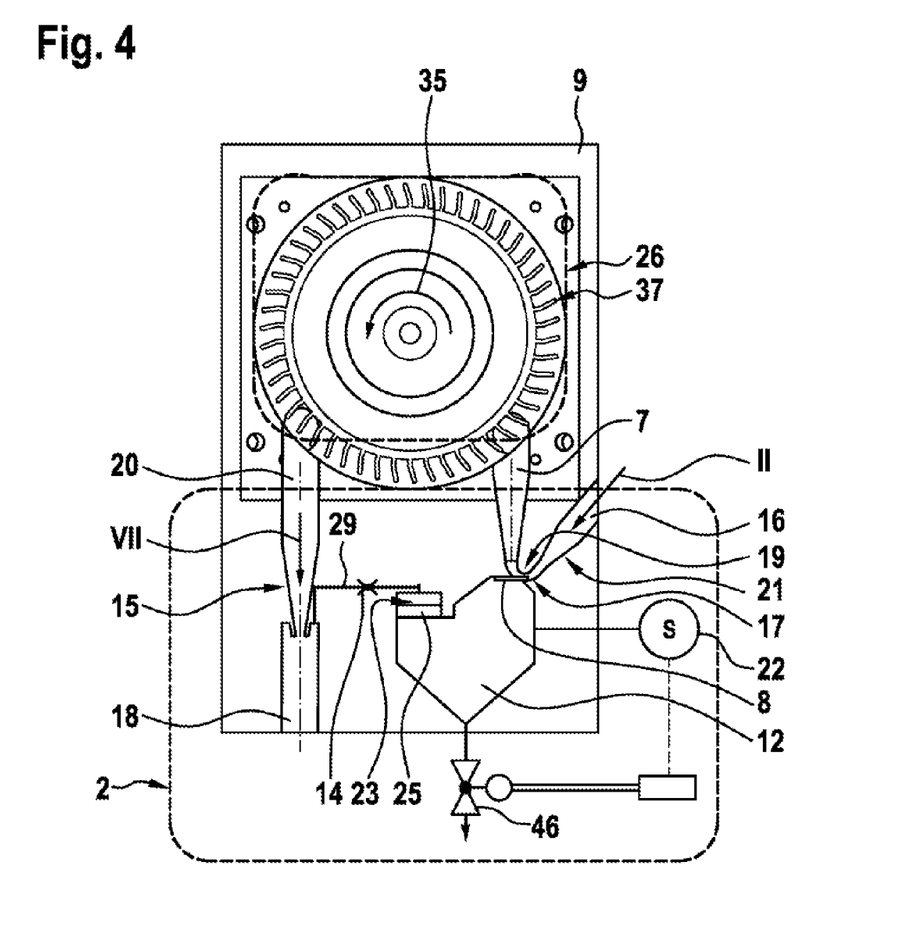

FIG. 4 shows that in the flow direction II, the gas-liquid separator 2 is situated upstream of the compressor chamber 26 of the recirculation pump 9, in particular in the region of the inlet 16. The recirculation pump 9 has the inlet 16, the separating edge 8 and the collecting tank 12, wherein in the flow direction II, the inlet 16 firstly has a second constriction 21 and then the curvature 19 with the radius 17, in particular in the region of the separating edge 8. The medium is accelerated in flow direction II when flowing through the second constriction 21. Furthermore, when flowing through the curvature 19 in flow direction II, the medium undergoes a deflection such that the constituents $H_2O$ and $N_2$, because of their mass, undergo a greater deflection and the light constituent $H_2$, because of its mass, undergoes a lesser deflection. The constituents $H_2O$ and $N_2$ and partially also $H_2$ are deflected into the collecting tank 12 by means of the separating edge 8. The $H_2$ is returned from the collecting tank 12 by the suction connection 29 into the outflow channel 20 of the recirculation pump 9.

The invention is not restricted to the exemplary embodiments described and the aspects emphasized herein. Rather, a plurality of derivatives are possible within the scope given by the claims.

What is claimed is:

1. A gas-liquid separator (2) of a fuel cell system (1) which comprises a recirculation pump (9), the gas-liquid separator (2) for separating at least one liquid component from a gaseous component with a collecting tank (12) which is supplied with a medium including $H_2$ and $H_2O$, wherein at least the liquid component of the medium is separated into the collecting tank (12), wherein the separated portion of the medium is discharged from the collecting tank (12) via a discharge valve (46),
    wherein the gas-liquid separator (2) is integrated into a housing (11) of the recirculation pump (9), and gas is returned from the collecting tank (12) via a suction connection (29) into an inflow channel (7) or an outflow channel (20) of the recirculation pump (9),
    wherein the liquid component of the medium comprises $H_2O$ and the gaseous component of the medium comprises $H_2$,
    wherein the gas-liquid separator (2) has a separating edge (8),
    wherein one of the inflow channel (7) or the outflow channel (20) has a curvature (19) with a radius (17), and
    wherein the separating edge (8) is configured such that, when the medium is flowing through the curvature (19), the medium meets the separating edge (8) such that the separating edge (8) deflects the $H_2O$ into the collecting tank (12).

2. The gas-liquid separator (2) as claimed in claim 1, wherein the gas-liquid separator (2) is arranged downstream of a compressor chamber (26) of the recirculation pump (9).

3. The gas-liquid separator (2) as claimed in claim 2, wherein the gas-liquid separator (2) is in the region of an outlet (18).

4. The gas-liquid separator (2) as claimed in claim 1, wherein the gas-liquid separator (2) is arranged upstream of a compressor chamber (26) of the recirculation pump (9).

5. The gas-liquid separator (2) as claimed in claim 4, wherein the gas-liquid separator (2) is in the region of an inlet (16).

6. The gas-liquid separator (2) as claimed in claim 3, wherein the outflow channel (20) in a flow direction of the medium has a constriction (15) and then the curvature (19).

7. The gas-liquid separator (2) as claimed in claim 6, wherein the radius (17) is in the region of the separating edge (8).

8. The gas-liquid separator (2) as claimed in claim 5, wherein the inflow channel (7) in a flow direction of the medium has a constriction (21) and then the curvature (19).

9. The gas-liquid separator (2) as claimed in claim 8, wherein the radius (17) is in the region of the separating edge (8).

10. The gas-liquid separator (2) as claimed in claim 6, wherein the medium also includes $N_2$, and wherein the medium is accelerated when flowing through the constriction (15) and the medium undergoes a deflection when flowing through the curvature (19), such that the $H_2O$ and the $N_2$, because of their mass, undergo a greater deflection, and the $H_2$, because of its mass, undergoes a lesser deflection.

11. The gas-liquid separator (2) as claimed in claim 10, wherein a proportion of the $H_2$ is deflected into the collecting tank (12).

12. The gas-liquid separator (2) as claimed in claim 1, wherein the suction connection (29) has a choke element (14).

13. The gas-liquid separator (2) as claimed in claim 1, wherein a membrane chamber (25) is situated between the collecting tank (12) and the suction connection (29), wherein the membrane chamber (23) has a membrane insert (23).

14. The gas-liquid separator (2) as claimed in claim 13, wherein the membrane insert (25) is configured as a semipermeable membrane (34), and wherein the $H_2$ can move through the membrane (34) while the $H_2O$ cannot move through the membrane (34) due to molecular sizes of the $H_2$ and the $H_2O$.

15. The gas-liquid separator (2) as claimed in claim 10, wherein the $H_2O$ and the $N_2$ is separated from the medium by the gas-liquid separator (2) via a centrifugal principle.

* * * * *